(12) United States Patent
Asahina et al.

(10) Patent No.: US 7,691,532 B2
(45) Date of Patent: Apr. 6, 2010

(54) SEALED PRISMATIC BATTERY

(75) Inventors: Takashi Asahina, Toyohashi (JP);
Hiromi Kajiya, Toyohashi (JP); Shinji Hamada, Toyohashi (JP); Toyohiko Eto, Kosai (JP)

(73) Assignees: Panasonic Corporation, Osaka (JP); Toyota Jidosha Kabushiki Kaisha, Aichi (JP)

( * ) Notice: Subject to any disclaimer, the term of this patent is extended or adjusted under 35 U.S.C. 154(b) by 170 days.

(21) Appl. No.: 11/789,910

(22) Filed: Apr. 26, 2007

(65) Prior Publication Data

US 2007/0202402 A1 Aug. 30, 2007

Related U.S. Application Data

(63) Continuation of application No. 10/349,683, filed on Jan. 23, 2003, now Pat. No. 7,226,694.

(30) Foreign Application Priority Data

Jan. 23, 2002 (JP) .............................. 2002-014704

(51) Int. Cl.
*H01M 2/24* (2006.01)
*H01M 2/20* (2006.01)
*H01M 2/02* (2006.01)

(52) U.S. Cl. ........................ 429/210; 429/153; 429/160

(58) Field of Classification Search ....................... None
See application file for complete search history.

(56) References Cited

U.S. PATENT DOCUMENTS

| 4,828,939 | A | * | 5/1989 | Turley et al. | ................... 429/38 |
| 6,399,960 | B1 | * | 6/2002 | Yamazaki et al. | ............. 257/59 |
| 6,569,561 | B1 | * | 5/2003 | Kimura et al. | ............... 429/159 |

FOREIGN PATENT DOCUMENTS

EP        1059680 A1 *   12/2000

* cited by examiner

*Primary Examiner*—Robert Hodge
(74) *Attorney, Agent, or Firm*—Jordan and Hamburg, LLP (57) ABSTRACT

A sealed prismatic battery has a battery case made of a plurality of prismatic cell cases coupled together via partition walls. Electrode plate groups are accommodated together with liquid electrolyte in each of the cell cases. Each electrode plate group consists of alternately stacked-up positive and negative electrode plates with separators interposed therebetween, lead portions of positive and negative electrode plates being protruded on opposite sides. Collectors are bonded to these lead portions. Between the collectors and end walls (and/or partition walls) of the battery case are provided conductive plates that are connected to the collectors one or more than one location in their middle part so as to decrease the resistance between connection terminals and the electrode plate groups.

3 Claims, 6 Drawing Sheets

SEALED PRISMATIC BATTERY

The present disclosure relates to subject matter contained in priority Japanese Patent Application No. 2002-14704, filed on Jan. 23, 2002, the contents of which is herein expressly incorporated by reference in its entirety.

BACKGROUND OF THE INVENTION

1. Field of the Invention

The present invention relates to a sealed prismatic battery, and particularly to a prismatic rechargeable battery module consisting of a plurality of cells with lower internal resistance.

2. Description of Related Art

One known rechargeable battery module consisting of a plurality of cells to achieve required power capacity has the following structure: The plurality of prismatic cells are arranged in parallel, with their longer lateral walls in contact with each other, and united by restraining bands together with end plates placed on the outer sides of the cells at the either end. Leads extending from the top ends of electrode plates of the cells upwards are connected to terminals mounted in the lid of the battery case, and these terminals of the cells are connected to each other via connection plates.

The cells are connected via a long connection path with many connection parts in this battery, resulting in large components' resistance. In fact, the proportion of the components' resistance in such a battery to reaction resistance caused by the reaction between positive and negative electrode plates and liquid electrolyte in the battery was as high as 40 to 50%, and the high heat generation because of the large internal resistance was a major barrier to the realization of higher power output or improvement in battery life. There was also the problem of high costs because of the large number of components required for the complex connection structure of the cells.

Figure 4:
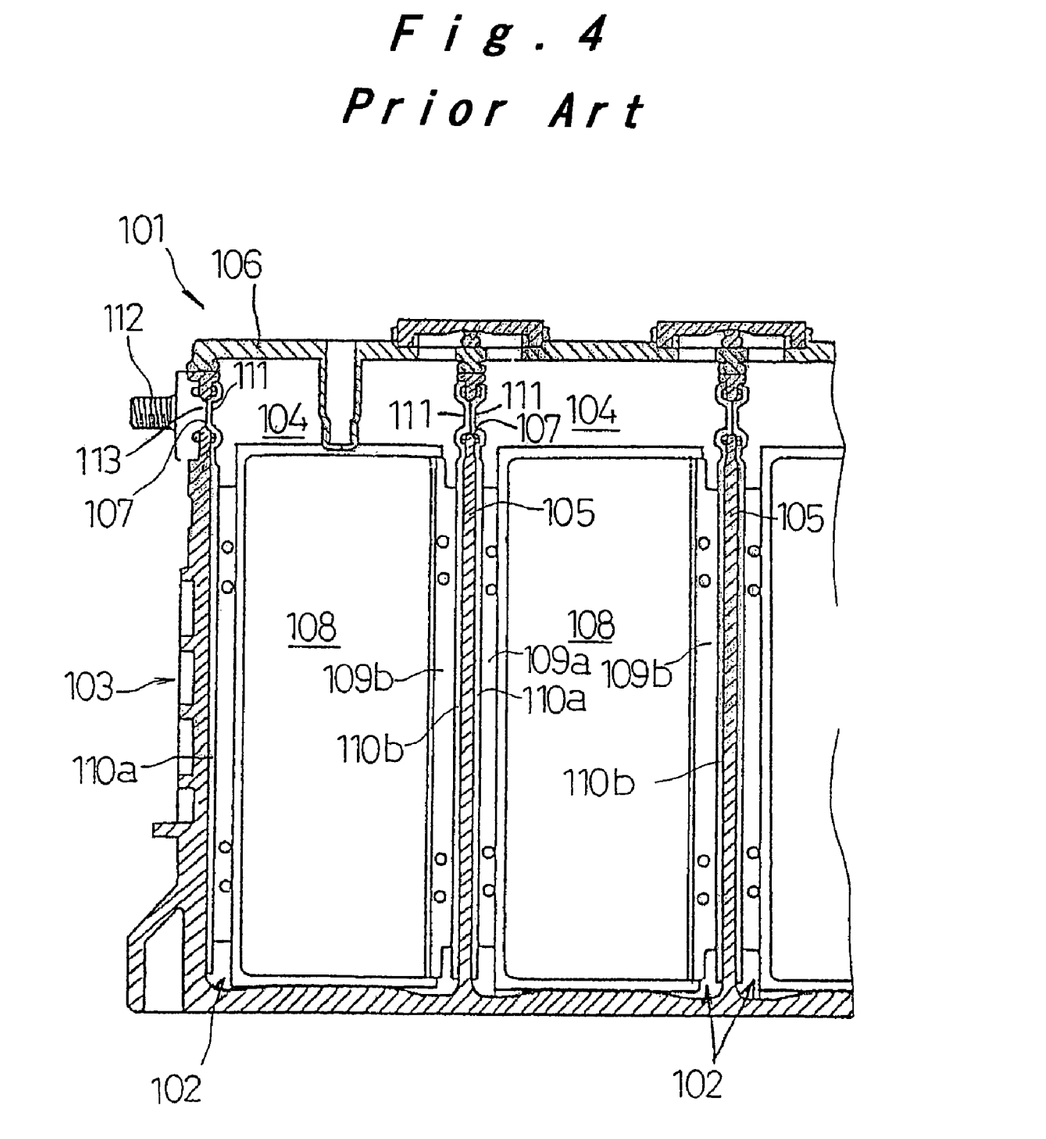
FIG. 4 is a partial longitudinal sectional front view of a conventional sealed prismatic battery.
Figure 5:
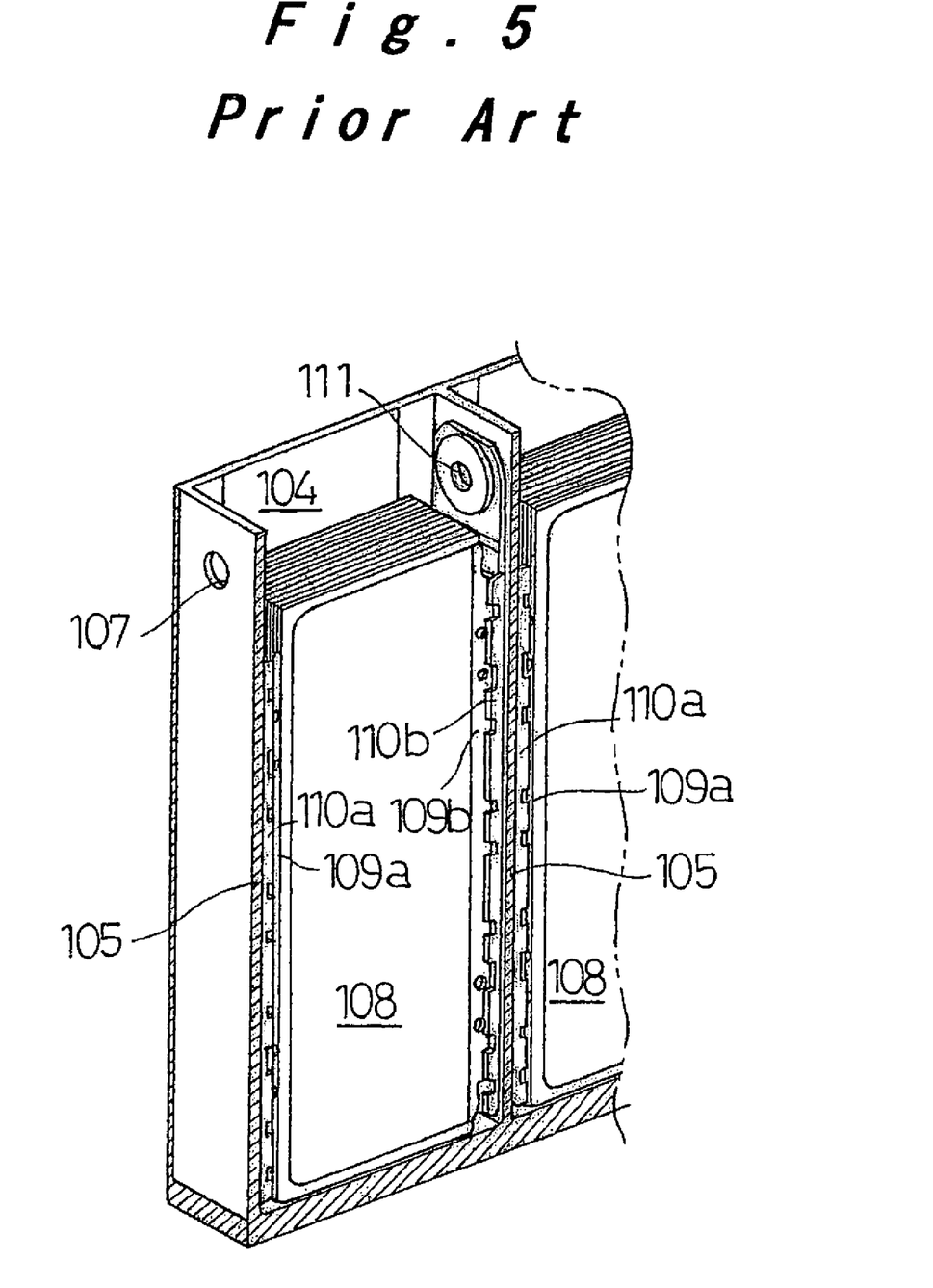
FIG. 5 is a partly broken perspective view of the battery case of the conventional battery.

In view of this, the applicants of the present invention have proposed a sealed prismatic battery 101 containing a plurality of cells 102 shown in FIG. 4 and FIG. 5. The battery 101 has a flat prismatic battery case 103 made of prismatic cell cases 104, which have short lateral walls and long lateral walls, of serially arranged cells 102. These cells are connected together in such a manner that their short lateral walls are used as partition walls 105 between the cells. The open top ends of the cell cases 104 are closed by an integral lid 106. Connection holes 107 are formed in the short lateral walls of the cell cases 104 at the far ends and in an upper part of each partition wall 105. Each cell case 104 constitutes a cell 102, accommodating liquid electrolyte and an electrode plate group 108 consisting of stacked-up rectangular positive and negative electrode plates and separators interposed in between them. Lateral edges on one side of the alternately stacked-up positive and negative electrode plates are protruded in opposite directions to form positive and negative leads 109a, 109b, respectively, to which collector plates 110a, 110b are connected by welding or the like.

In an upper part of the collector plates 110a, 110b is protruded a connection boss 111 which fits into the connection hole 107. The connection bosses 111 of positive and negative collector plates 110a, 110b are connected together by welding between adjacent cell cases 104. In the connection holes 107 in the end faces of the cell cases 104 at either far end are fitted positive and negative connection terminals 112 with connection bosses 113, respectively, and these connection bosses 113 are each connected to the connection bosses 111 of positive and negative collector plates 110a, 110b by welding. The plurality of cells 102 are thus connected in series in the battery case 103 such as to output power via the connection terminals 112 at both ends.

Figure 6:
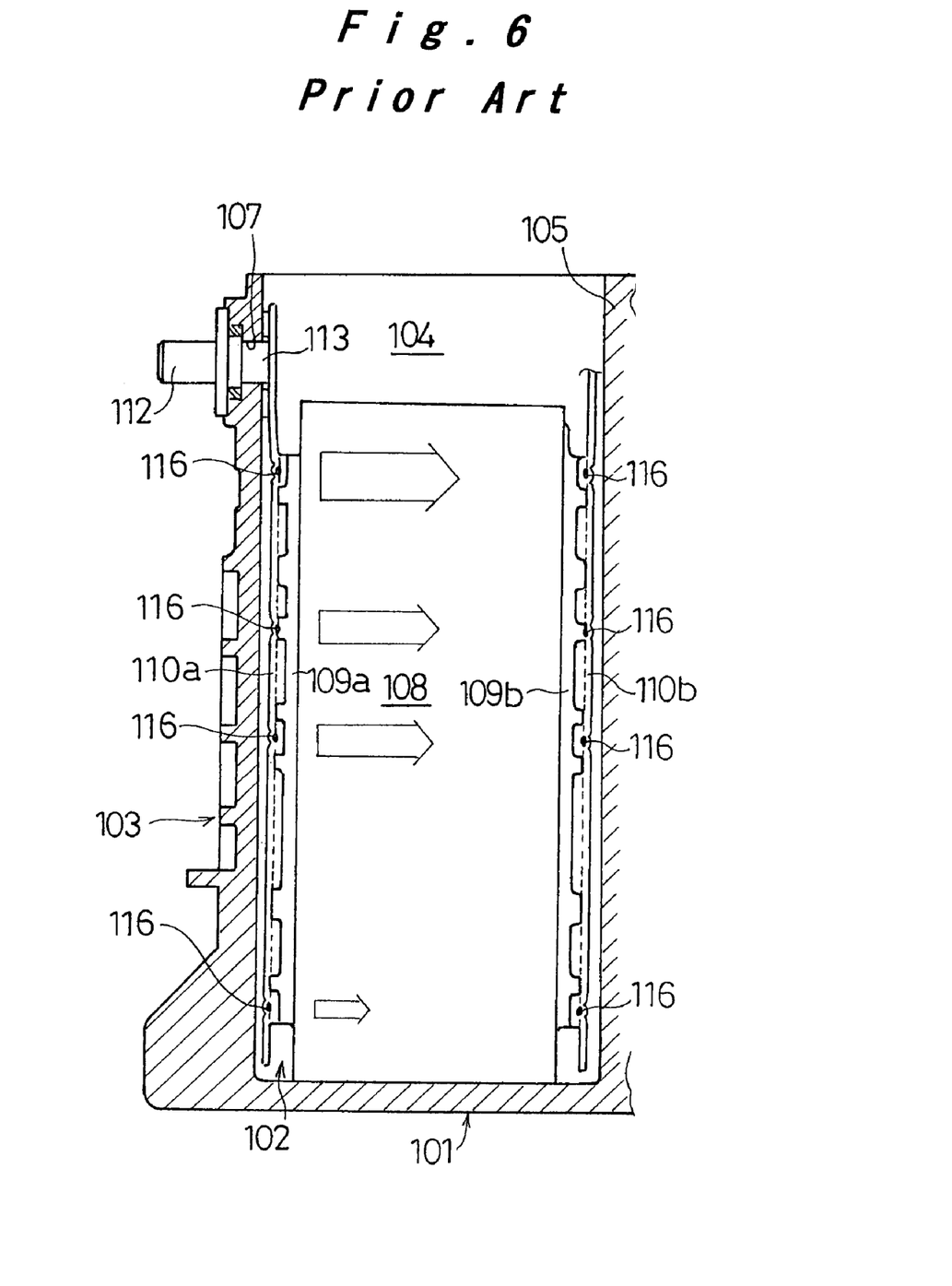
FIG. 6 is a diagram for showing the current flow paths in the conventional battery.

In this structure, the connection terminals 112 are disposed at the upper part of the end walls of the battery case 103, their connection bosses 113 being bonded to the upper part of the collector plates 110a, 110b. Consequently, the connection arrangement between the collector plates 110a, 110b and the electrode plate group 108 welded together at a plurality of bonds 116 located at suitably spaced intervals along the length of the collector plates results in uneven current distribution in the electrode plate group 108 due to the small cross section and large resistance of the collector plates 110a, 110b. As illustrated by white arrows in FIG. 6, the amount of current flowing from the connection terminal 112 through the collector plate 110a via the bonds 116 into the electrode plate group 108 is larger at bonds 116 nearer to the connection terminal 112 and smaller at bonds farther from the connection terminal. As a result, the electrode plate groups 108 cannot exhibit their power generating properties uniformly, causing considerable power loss.

What is worse, there is a problem of high internal resistance caused by the connection arrangement of the collector plates 110a, 110b facing each other via partition walls 105. That is, despite the relatively short current flow path from the positive and negative electrode plates to the collector plates 110a, 110b, the internal resistance is relatively high, since the collector plates 110a, 110b are welded together at one location at the tips of their respective connection bosses 111 at the top. This connection arrangement also causes uneven current distribution in the electrode plate groups 108 because of the differing distances from the connection points at the top to respective bonds 116. As a result, the electrode plate groups 108 cannot exhibit their power generating properties uniformly, causing considerable power loss.

SUMMARY OF THE INVENTION

The present invention has been devised in light of the problems in prior art described above, its object being to provide a sealed prismatic battery having lower internal resistance per cell and being capable of outputting higher power by ensuring that power generation of all the electrode plate groups is uniform.

A sealed prismatic battery according to the present invention includes: a prismatic battery case made of a plurality of prismatic cell cases coupled together via partition walls;

a plurality of electrode plate groups respectively encased in the cell cases together with liquid electrolyte and comprised of a plurality of positive electrode plates and a plurality of negative electrode plates alternately stacked upon one another with separators interposed therebetween, one side edge of the positive electrode plates and the other side edge of the negative electrode plates being protruded in opposite directions to form respective lead portions; and a plurality of collectors each bonded to the lead portions on both sides of the electrode plate groups, wherein conductive plates are interposed between end walls of the battery case and collectors facing the end walls or between each partition wall of adjacent cells and the collectors facing the partition walls, the conductive plates being connected to the collectors at one or more than one location in a middle part of the collectors.

With this structure, not only is the distance between each electrode plate and collectors short but also the distance between the collectors and conductive plates are short because they are connected together at one or more than one location in the middle part of the collectors, whereby resistance between the electrode plates and conductive plates is small. The disadvantage of longer current flow paths can be counterbalanced by employing a material that has lower resistance for the conductive plates, so the conductive plates can be connected to external terminals at any given location while resistance is maintained low. These all lead to lower internal resistance per cell of the battery.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 3A is a front view, FIG. 3B is a side view, and FIG. 3C is an enlarged view of the part 111C of FIG. 3B, illustrating a modified example of the conductive plate;

DETAILED DESCRIPTION OF PREFERRED EMBODIMENTS

One embodiment of a sealed prismatic battery according to the present invention will be hereinafter described with reference to FIG. 1 to FIG. 2B.

The battery 1 has a prismatic battery case 3 made of a plurality of prismatic cell cases 4, which have short lateral walls and long lateral walls and are connected together in such a manner that their short lateral walls are used as partition walls 5. The battery case 3 is made of synthetic resin such as a PP/PPE alloy which is repellent against liquid electrolyte. In an upper part of the end walls 3a of the battery case 3 are formed connection holes 7, in which connection bosses 13 of connection terminals 12 will be fitted. The connection holes 7 are provided with grooves 7a at their inner periphery for accommodating a sealing material 7b such as an O-ring.

Each cell case 4 constitutes a cell 2, accommodating liquid electrolyte and an electrode plate group 8, to both sides of which collectors 10 have been bonded. The electrode plate group 8 is made up of a plurality of positive and negative electrode plates that are stacked up alternately. Each positive electrode plate is enveloped in a bag-shaped separator having an opening on one side, so the separator is interposed between each pair of positive and negative electrode plates. One side edge of positive electrode plates and the other side edge of negative electrode plates are protruded in opposite directions so as to form respective lead portions 9. The collectors 10 are bonded to these lead portions 9 on both sides of the electrode plate group 8.

The sealed prismatic battery 1 of this embodiment is constituted as a nickel-metal hydride battery. The positive electrode plates are made of a nickel foam metal coated with nickel hydroxide except for the lead portion 9. A portion of the nickel foam metal that is to become the lead portion 9 is compressed, and a lead plate is seam welded by ultrasonic welding to one face of this portion. The negative electrode plates are made of a nickel punched metal sheet coated with negative electrode constituent materials including hydrogen-absorption alloy except for the lead portion 9.

Collectors 10 are made of nickel-plated steel plate. The bond between the collectors 10 and the lead portions 9 is achieved by electron beam welding or the like at a plurality of bonds 16 (four in the illustrated example) at vertically spaced points in the collectors 10.

Between the end wall 3a of the battery case 3 and the collector 10 facing the end wall is interposed a conductive plate 17 connected to the collector 10 at two locations, one between an upper pair of bonds 16 and the other between a lower pair of bonds 16. The conductive plate 17 extends upwards to a position where the tip of the connection boss 13 of the connection terminal 12 is connected by welding. A sealing material 7c such as pitch is provided around the portion where the connection boss 13 is connected to the conductive plate 17 so as to secure a seal between the conductive plate 17 and the inner face of the end wall 3a. Thus the portion of the end wall 3a where the connection boss 13 passes through is double-sealed by the sealing materials 7b and 7c.

Figure 2A:
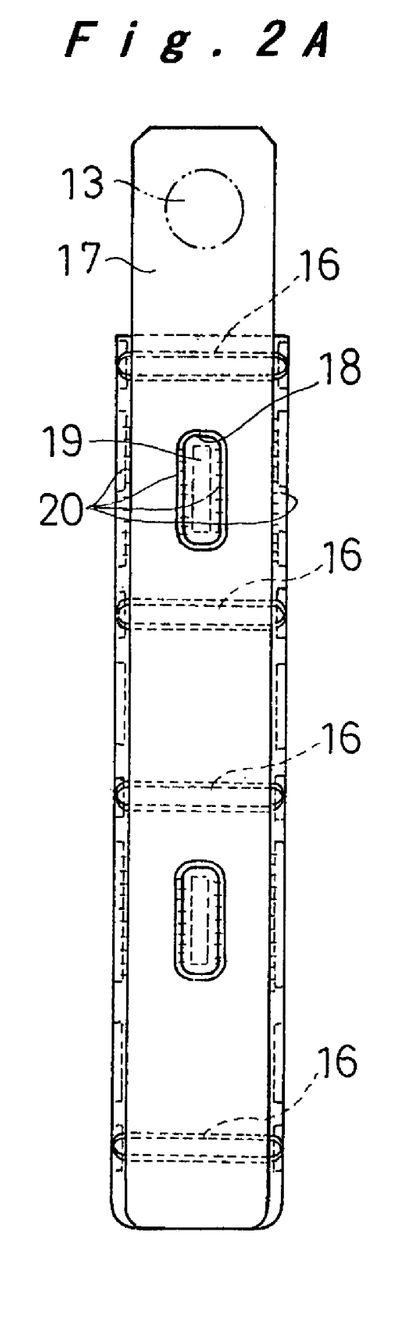
FIG. 2A and FIG. 2B illustrate the major parts of the same embodiment in more detail, FIG. 2A being a front view of a collector and a conductive plate, and FIG. 2B being a front view of the conductive plate.
Figure 2B:
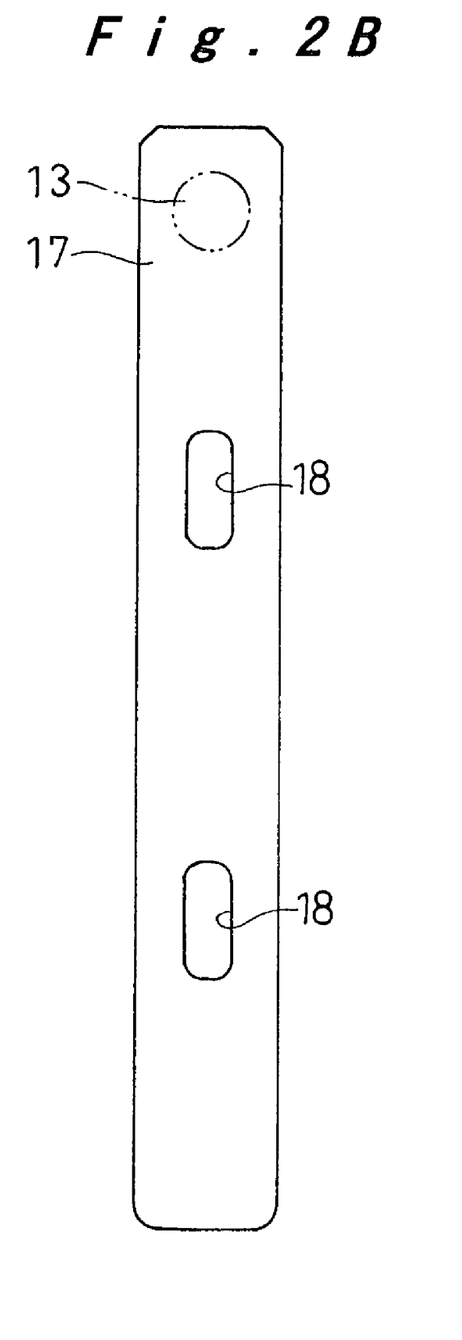

The conductive plate 17 and the collector 10 are connected together via welds 20 as shown in FIG. 2A and FIG. 2B: The conductive plate 17 is formed with holes 18 of rectangular or oblong form, and the collector 10 has corresponding bosses 19 that fit into these holes 18 on its outer face. The welds 20 are formed along the interface between the inner periphery of the holes 18 and outer periphery of the bosses 19, and at the edges of the collector 10 on both sides of the holes 18.

Figure 1:
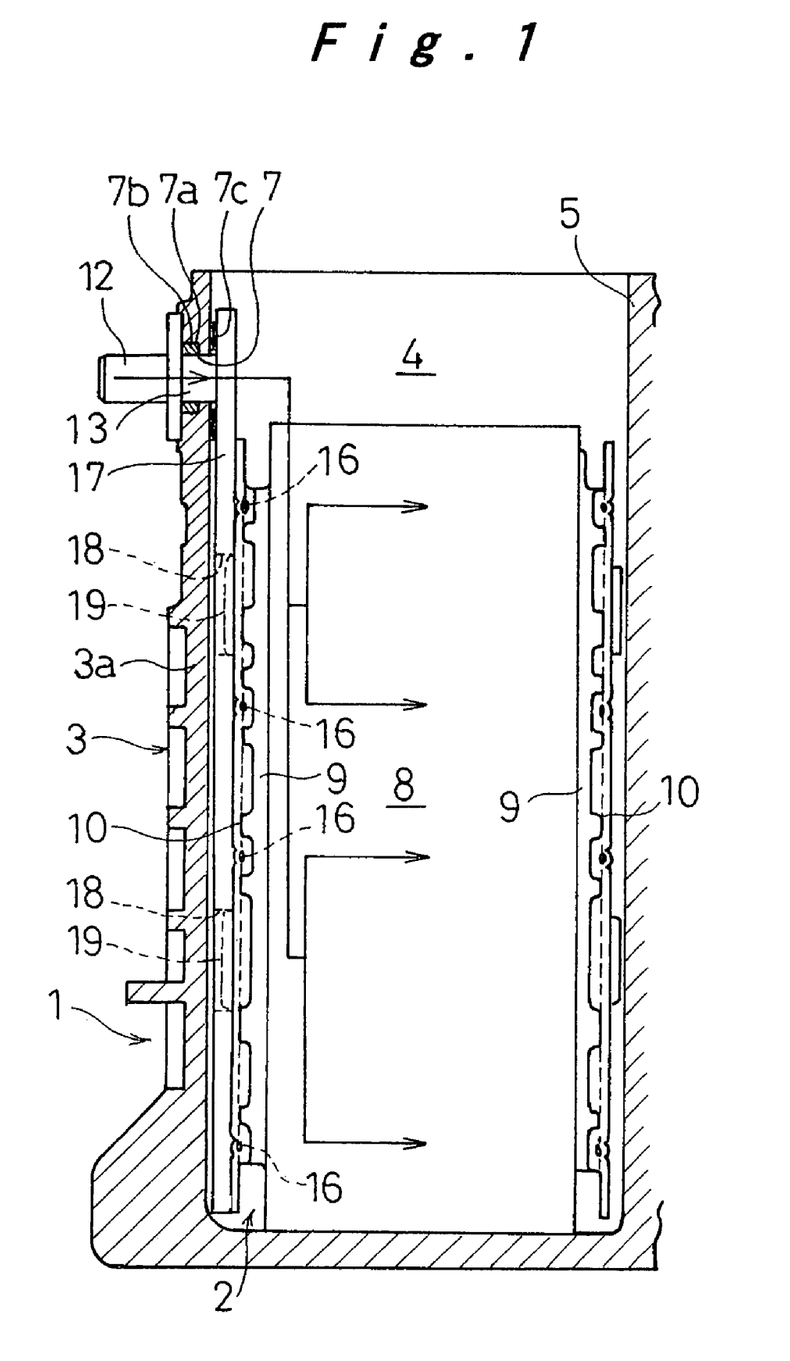
FIG. 1 is a longitudinal sectional front view illustrating major constituent elements of a sealed prismatic battery according to one embodiment of the present invention.

Although not shown in FIG. 1, adjacent cells 2, 2 can also be connected together using conductive plates 17, i.e., conductive plates 17 can be interposed between every collector 10 and the partition wall 5. Connection between the adjacent cells 2, 2 can be established likewise by connecting the conductive plates 17 on both sides of each partition wall 5 together through the connection holes 7 in the partition walls 5. Alternatively, collectors 10 themselves can be connected together at more than one location, i.e., they can be welded together at the upper location via connection bosses 11 formed in the upper part of the collectors 10 and fitted in the connection holes 7, and at a middle location via not-illustrated additional connection members. The connection between collectors 10 on both sides of a partition wall 5 at such middle location can be achieved through an opening (not shown) that is formed in the partition wall 5 to allow access into the cell cases 4 on both sides of the partition wall 5.

According to this embodiment, not only is the distance between the positive and negative electrode plates of the electrode plate group 8 and their respective collectors 10 short, but also the distance between the collectors 10 and the conductive plates 17 is short because they are connected together at a plurality of locations in the middle part of the collectors 10, so the resistance between electrode plates and conductive plates 17 is small. Although the current flow path is longer at either end of the battery case 3 where the conductive plates 17 are extended to the top of the end walls 3a to be connected to the connection terminals 12, an increase in the resistance can be avoided by employing a material for the conductive plate 17 that has a larger cross section (smaller resistance) than the collectors 10. The resistance in the current flow path that runs from the connection terminals 12 via the conductive plates 17 and collectors 10 into each electrode plate is thus reduced, leading to lower inner resistance per cell 2 of the sealed prismatic battery 1.

As mentioned above, the conductive plates 17 may be interposed between each partition wall 5 between two adjacent cells 2 and collectors 10, to counterbalance the disadvantage of the detouring current flow path via the connection holes 7 at the top of the partition walls 5. That way, the resistance in the current flow path is reduced, leading to lower inner resistance per cell 2 of the battery 1. In this case, however, the conductive plates 17 will take up some space inside the cell cases 4, resulting in a decrease in the capacity of the electrode plate groups 8.

To avoid this, adjacent cells 2, 2 may be connected together via collectors 10, 10 themselves at their top ends as well as in their middle part. In other words, the effect of reducing the overall internal resistance of the battery can be achieved only by using the conductive plates 17 for the connection arrangement between the connection terminals 12 and collectors 10 at either end of the battery.

The collectors 10 are welded to the electrode plate groups 8 at a plurality of bonds 16 spaced apart a suitable distance from each other along the length of the collectors 10. These bonds 16 are divided into upper and lower groups, and the collectors 10 are connected to the conductive plates 17 at locations between the bonds 16, 16 of the upper and lower groups. Consequently, as indicated by the arrows in FIG. 1, current flowing from the connection terminal 12 runs through the conductive plate 17 into the collector 10 via the plurality of connection interfaces 18 to 20 in the middle part of the collector 10 and into the electrode plate group 8 via the plurality of bonds 16. The current distribution in the electrode plate group 8 is thus made even, which makes the power generating properties of the electrode plate group 8 uniform, leading to higher power output of the battery.

The connection between the collector 10 and conductive plate 17 is established at a plurality of locations via the welds 20 provided at the interface between the inner periphery of the holes 18 in the conductive plate 17 and outer periphery of the matching bosses 19 on the collector 10 and at the edges of the collector 10 on both sides of the holes 18. This arrangement ensures a connection with low resistance between the conductive plate 17 and collector 10.

Figure 3A:
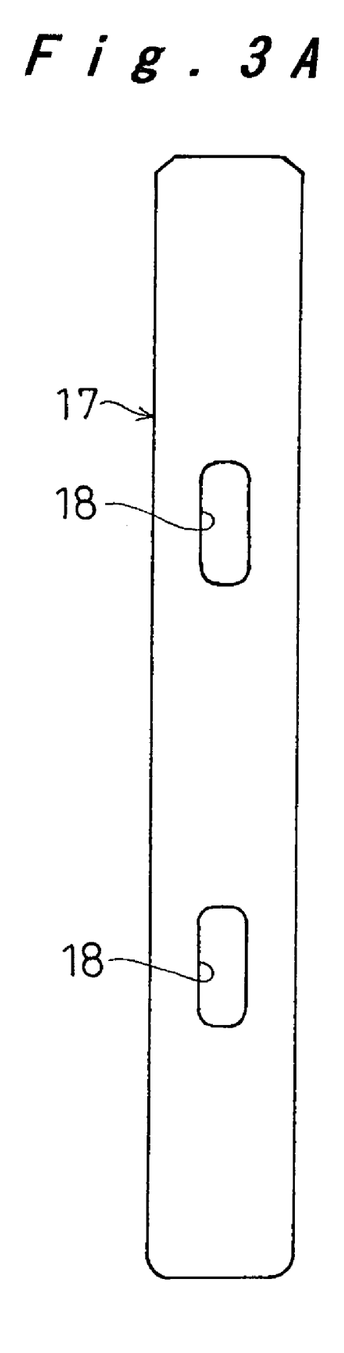
Figures 3B, 3C:
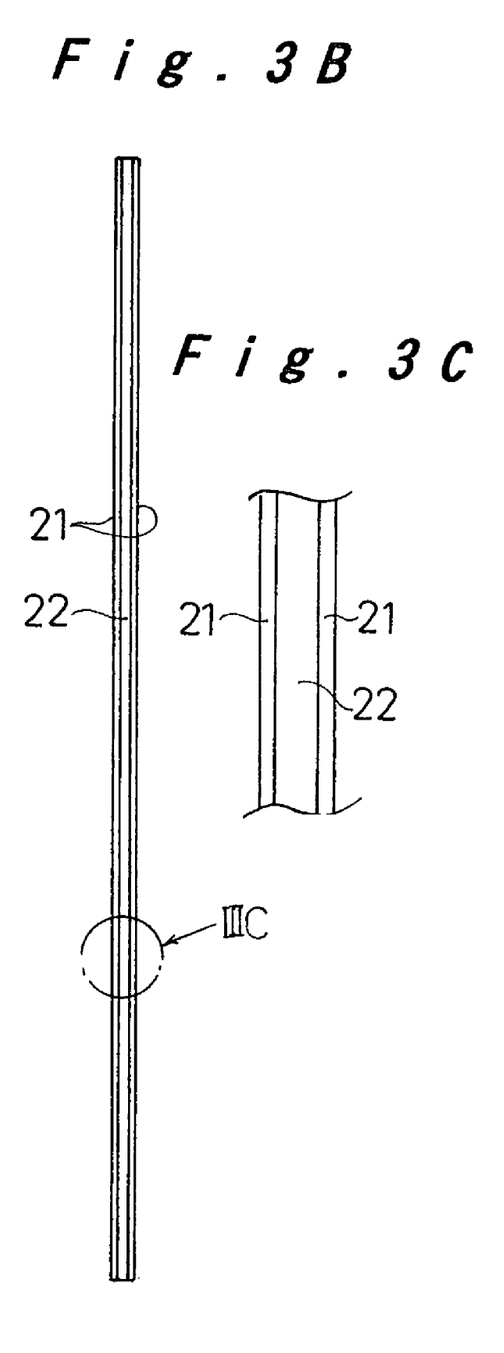

In the embodiment described above, the conductive plate 17 is made of one material, i.e., steel plate that is nickel-plated so as to be repellent against liquid electrolyte. FIGS. 3A to 3C show a modified example of constructing the conductive plate 17 with three-layered clad steel sheet. Steel sheet 21 constitutes both faces of the conductive plate 17 for reliable welding, and a strip of copper sheet 22 having high conductivity is interposed between the steel sheet 21. The clad sheet is further nickel-plated so as to be repellent against liquid electrolyte. Resistance of the conductive plate 17 is thereby further reduced, leading to a further decrease in the internal resistance per cell 2 of the battery.

According to the sealed prismatic battery of the present invention, conductive plates are interposed between the collectors and the end walls or partition walls of the battery case, which conductive plates are connected to the collectors at one or more than one location in the middle part. Thus the distance between each electrode plate and collectors and the distance between the collectors and conductive plates are both short, whereby resistance between the electrode plates and conductive plates is small. The conductive plates can be connected to external terminals at any given location while resistance is maintained low by employing a material that has lower resistance for the conductive plates. These all lead to lower internal resistance per cell of the battery.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A sealed prismatic battery, comprising:
a battery case including two end walls and partition walls spaced apart therebetween to define cell cases;
electrode plate groups receivable in the cell cases together with liquid electrolyte, said electrode plate groups each including positive electrode plates and negative electrode plates alternately stacked upon one another with separators interposed therebetween, one side edge of each of the positive electrode plates and an other side edge of each of the negative electrode plates being protruded in opposite directions to form respective lead portions;
collectors each bonded to a respective one of the lead portions on both sides of the electrode plate groups; and
a conductive plate being disposed at each of said two end walls of the battery case and interposed between each of said end walls and a respective one of said collectors facing each of the end walls, said conductive plate being connected to a respective one of the collectors at one or more than one location in a middle part of the collectors, the conductive plate having a smaller resistance than the collector and having a larger cross section than a corresponding cross section of said collector.

2. A sealed prismatic battery, comprising:
a battery case including two end walls and partition walls spaced apart therebetween to define cell cases;
electrode plate groups receivable in the cell cases together with liquid electrolyte, said electrode plate groups each including positive electrode plates and negative electrode plates alternately stacked upon one another with separators interposed therebetween, one side edge of each of the positive electrode plates and an other side edge of each of the negative electrode plates being protruded in opposite directions to form respective lead portions;
collectors each bonded to a respective one of the lead portions on both sides of the electrode plate groups;
a conductive plate being disposed at each of said two end walls of the battery case and interposed between each of said end walls and a respective one of said collectors facing each of the end walls, said conductive plate being connected to a respective one of the collectors at one or more than one location in a middle part of the collectors, the conductive plate having a smaller resistance than the collector;
the collectors and the electrode plate groups being connected together at bonds spaced apart a predetermined distance from each other along the length of the collectors; and
the collectors and the conductive plates being connected together at locations between said bonds.

3. A sealed prismatic battery, comprising:
a battery case including two end walls and partition walls spaced apart therebetween to define cell cases;
electrode plate groups receivable in the cell cases together with liquid electrolyte, said electrode plate groups each including positive electrode plates and negative electrode plates alternately stacked upon one another with separators interposed therebetween, one side edge of each of the positive electrode plates and an other side edge of each of the negative electrode plates being protruded in opposite directions to form respective lead portions;

collectors each bonded to a respective one of the lead portions on both sides of the electrode plate groups;

a conductive plate being disposed at each of said two end walls of the battery case and interposed between each of said end walls and a respective one of said collectors facing each of the end walls, said conductive plate being connected to a respective one of the collectors at one or more than one location in a middle part of the collectors, the conductive plate having a smaller resistance than the collector;

the conductive plates including holes;

the collectors being formed with protrusions that fit into the holes; and the connection between the collectors and the conductive plates being achieved by welding an inner periphery of the holes and an outer periphery of the protrusions.

* * * * *